(No Model.)

A. TERLINDEN & W. VAN GALEN.
APPARATUS FOR REGULATING MOTION.

No. 463,010. Patented Nov. 10, 1891.

Witnesses.
A. H. Norris.
Robert Garrett.

Inventors.
August Terlinden.
Wilhelm van Galen.
By James L. Norris.
Atty.

UNITED STATES PATENT OFFICE.

AUGUST TERLINDEN AND WILHELM VAN GALEN, OF REES, GERMANY.

APPARATUS FOR REGULATING MOTION.

SPECIFICATION forming part of Letters Patent No. 463,010, dated November 10, 1891.

Application filed March 13, 1890. Serial No. 343,751. (No model.) Patented in Germany June 22, 1889, No. 50,698.

*To all whom it may concern:*

Be it known that we, AUGUST TERLINDEN, a subject of the King of Prussia, and WILHELM VAN GALEN, a subject of the King of the Netherlands, both residing at Rees on the Rhine, Germany, having invented certain new and useful Improvements in Apparatus for Regulating Motion, (for which we have obtained a patent in Germany, dated June 22, 1889, No. 50,698,) of which the following is a full, clear, and exact specification.

This invention relates to hydraulic brake or escapement devices and regulating mechanism connected therewith for small mechanical movements in which a power produced by a weight, spring, or any other means shall be caused to act slowly and according to definite rules in order to obtain uniform or varying velocities or motions, as may be required. In the improved hydraulic devices a quantity of liquid inclosed in a rotary hollow body, ordinarily in the form of a drum, is compelled by a novel interior arrangement to take a definite course, and thus effect a retarding action.

The invention consists in the features of construction and the combination or arrangement of devices hereinafter described and claimed, reference being made to the accompanying drawings, in which—

Figure 1:
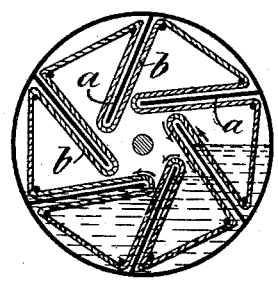
Figure 2:
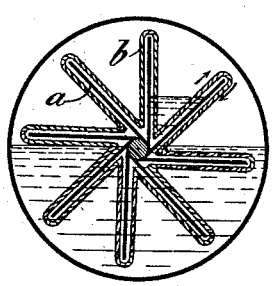
Figure 3:
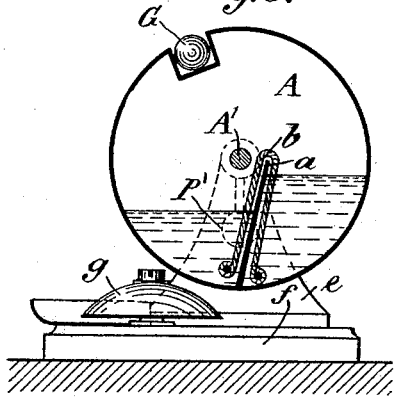
Figure 4:
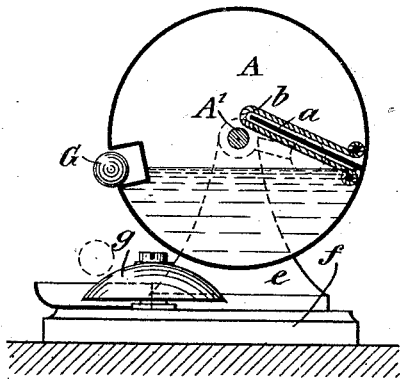
Figure 5:
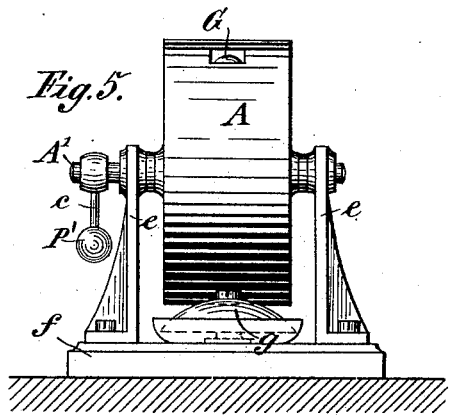

Figure 1 is a sectional view of an apparatus embodying our invention. Fig. 2 is a similar view showing a modified arrangement of partitions and wick. Fig. 3 is a partial sectional view showing the apparatus adapted as an egg clock or time-piece. Fig. 4 is a similar view showing the drum partially rotated to release the gong-sounding ball. Fig. 5 is a front elevation of the same.

In order to enable those skilled in the art to make and use our invention, we will now describe the same in detail, reference being made to the accompanying drawings, wherein—

The letter A indicates a cylindrical drum, which, as shown in Fig. 1, is provided with a series of six partitions $a$, arranged obliquely to the axis of the drum. A wick $b$, of suitable material, passes without interruption along the opposite sides of the partitions and round the inner extremities thereof. To retain the wick in proper position we prefer to employ a series of pins properly arranged, so that the wick is held upon the partitions and can extend continuously through the series of chambers formed by such partitions.

In the modification, Fig. 2, the partitions $a$ are arranged tangentially to the shaft of the drum, and their outer extremities terminate in proximity to the inside of the drum for the purpose of providing the requisite spaces or openings for the passage of a liquid contained in the drum from one chamber to another.

In Fig. 2 a series of eight partitions are employed; but the number may be variously modified without altering the character of our invention. For instance, as shown in Figs. 3, 4, and 5, a single partition may be used to provide two chambers within the drum. In this construction the wick $b$ will be secured at its extremities and extend along opposite sides of the partition and round the inner extremity thereof, as will be clearly understood by reference to the drawings.

Whether one or more partitions be employed to provide a series of chambers within the drum, the wick fulfills the conditions required to slowly transfer the liquid from one chamber to another. As the liquid requires time to pass from one chamber to another, there will take place at every partition before which the liquid passes in a turning movement of the drum a retardation in the velocity of the movement if the drum is set in motion by an outer force—such, for instance, as a weight acting on one side.

In Figs. 3, 4, and 5 we have represented our invention employed as an egg clock or time-piece. The drum is adapted to turn freely between brackets $e$ $e$, and is provided interiorly with a partition $a$, placed obliquely to the shaft or axle $A'$, and with a wick $b$ extending over the said partition. On the outer circumference of the drum is arranged a cup for the reception of a small ball weight G, and on the axis $A'$ is fixed a lever $c$, with a counter-weight $P'$. The two brackets $e$ $e$ are secured to the base-plate $f$, which carries at its end a bell $g$, suspended freely. This bell is struck at the end of the definite time by the falling ball G in the following manner:

When the apparatus is to be used, for example, in the boiling of eggs, the small ball G is put in the cup arranged on a drum A, and which in the initial position of the drum, Fig. 3, is somewhat laterally—that is to say, not quite vertically above the axis A'. The ball therefore causes by its greater weight the turning of the drum in the direction of the arrow, which turning movement is retarded by the liquid contained in the drum. The more liquid passes through the wick $b$ from the right-hand side of the partition $a$ to the left-hand side the farther the ball G will move down, until it drops from the cup and strikes the bell $g$, whereby the desired signal is given for taking out the eggs. According to the quantity of the liquid and the sucking power of the wick the interval of time between the introduction of the ball and the falling of the same from the cup will vary. It is therefore possible to determine the time in such a manner that the eggs are boiled hard or soft when the signal is given. After use the drum A, by reason of the action of the counter-weight P', returns of itself to its initial position, the wick again causing the transfer of the liquid from one chamber to another.

We wish it to be clearly understood that the invention is useful for many purposes, and therefore we do not confine ourselves to the use of the invention as an egg clock or time-piece, for it can be variously used as a hydraulic brake or escapement device wherever it is desired to obtain uniform or varying velocities or motions.

Having thus described our invention, what we claim is—

1. A hydraulic brake or escapement device consisting of a rotating drum containing a body of liquid, and a partition to provide a series of compartments therein, and a wick extending along opposite sides of the partition and round the extremity thereof for slowly transferring the liquid from one compartment to the other, substantially as and for the purposes described.

2. A hydraulic brake or escapement device consisting of a drum rotated by an external force and containing a body of liquid, and a series of partitions to provide a series of chambers or compartments, and a wick extending along the opposite sides of the partitions and round their extremities for slowly transferring the liquid from one chamber or compartment to another, substantially as and for the purposes described.

In testimony whereof we have hereunto signed our names in the presence of two subscribing witnesses.

AUGUST TERLINDEN.
WILHELM VAN GALEN.

Witnesses:
D. J. PARLETTE,
F. H. THOMAS.